United States Patent [19]

Black et al.

[11] Patent Number: 6,091,319

[45] Date of Patent: *Jul. 18, 2000

[54] METHOD FOR RESOLVING SIGNALS COLLISIONS BETWEEN MULTIPLE RFID TRANSPONDERS IN A FIELD

[75] Inventors: Donald L Black, Erie; Dale Yornes, Boulder, both of Colo.

[73] Assignee: Micron Technology, Inc., Boise, Id.

[*] Notice: This patent is subject to a terminal disclaimer.

[21] Appl. No.: 09/395,999

[22] Filed: Sep. 13, 1999

Related U.S. Application Data

[63] Continuation of application No. 08/922,491, Sep. 3, 1997.

[51] Int. Cl.[7] .................................................. H04Q 5/22
[52] U.S. Cl. ................... 340/10.2; 340/10.3; 340/10.42; 340/825.34; 340/825.31; 714/748; 714/749; 714/797; 714/799
[58] Field of Search ................................. 340/10.2, 10.3, 340/825.34, 825.31, 10.42; 714/797, 748, 749, 799

[56] References Cited

U.S. PATENT DOCUMENTS

| | | | |
|---|---|---|---|
| 5,339,073 | 8/1994 | Dodd et al. | 340/825.31 |
| 5,583,819 | 12/1996 | Roesner et al. | 340/825.34 |
| 5,742,618 | 4/1998 | Lowe | 371/36 |
| 5,745,049 | 4/1998 | Akiyama et al. | 340/825.54 |
| 5,751,573 | 5/1998 | Stobbe et al. | 340/825.54 |
| 5,802,080 | 9/1998 | Westby | 371/37.01 |
| 5,986,570 | 11/1999 | Black | 340/10.2 |

FOREIGN PATENT DOCUMENTS

| | | |
|---|---|---|
| 0 405 695 | 1/1991 | European Pat. Off. . |
| 0 685 825 | 12/1995 | European Pat. Off. . |
| 0 689 151 | 12/1995 | European Pat. Off. . |
| 0 702 324 | 3/1996 | European Pat. Off. . |
| 0 709 803 | 5/1996 | European Pat. Off. . |
| 0 755 026 | 1/1997 | European Pat. Off. . |

Primary Examiner—Brian Zimmerman
Assistant Examiner—Yves Dalencourt
Attorney, Agent, or Firm—Wells, St. John, Roberts, Gregory & Matkin, P.S.

[57] ABSTRACT

Communications between an RFID interrogator and an RFID transponder require that no more than one transponder be present in the reading range of the interrogator and transmitting into motion at any given time. If multiple transponders are in the field, then a collision between the return signals of the transponders occurs, rendering the signals unreadable. A method to resolve the collisions and allow for accurate transmission of each transponder's data is given. This method is especially effective over other methods when the transponder is a read-only type of device, whereby there is no communications interrogator on board the read-only transponder.

34 Claims, 6 Drawing Sheets

METHOD FOR RESOLVING SIGNALS COLLISIONS BETWEEN MULTIPLE RFID TRANSPONDERS IN A FIELD

CROSS REFERENCE TO RELATED APPLICATION

This is a Continuation of U.S. patent application Ser. No. 08/922,491, filed Sep. 3, 1997, and titled "Method for Resolving Signal Collisions Between Multiple RFID Transponders in a Field"which is now U.S. Pat. No. 5,986,570.

FIELD OF THE INVENTION

The present invention relates to electronic identification devices and systems, and in particular, to devices where their application in a system will allow more than one device to be present in the interrogator field at any moment in time. Furthermore, the system requires that all the devices in the field are properly identified by the interrogator.

BACKGROUND OF THE INVENTION

There are methods currently in use that provide varying degrees of success in resolving the collision of the tags, and especially in tags with read/write capability, where communications to the tags is facilitated by an on-board interrogator in the RFID tag. In such a tag, the interrogator can send signals to allow tags to respond with a random number that is manipulated by the interrogator and transmitted to all tags in the field. Only the tag that matches the computed number generated by the interrogator will transmit its data. This process continues until all tags have transmitted their data. This method significantly increases the complexity of the transponder by requiring the transponder to include an interrogator and being only partially effective for regulation of collisions.

Another method of collision resolution is to cause tags to transmit at different frequencies, thereby avoiding a collision of signals. This method significantly increases the complexity of the interrogator while being only partially effective for resolution of the collision.

Yet another method involves the use of spread spectrum techniques. The technique can be either direct sequence spread spectrum (DSSS) or frequency hopping. Either method requires correlation of the signal in the interrogator and requires a very complex interrogator system.

Another method of collision resolution uses part of the unique identification code of the transponder to provide a specific time whereby the transponder transmits its data, and all other times, the transponder remains inactive. This feature is limited by the vast number of unique transmission slots available, and the time required to read all the possible tags in the field. Moreover, a single transponder in the field could take an inordinate amount of time to be read. If the unique identification code is truncated to allow for faster performance, then the probability of an un-resolvable collision occurs due to the duplication of codes.

One other method for resolution is the utilization of a random oscillator and a binary counter on each transponder which enables transmission from the transponder when the counter is in a specific state. All other times the transponder is inactive. This method has the disadvantage of requiring alignment of all the transponders asynchronously before coherent data can be received by the interrogator.

All the above methods require either the use of expensive and complicated interrogator systems, a read-write tag, or they are excessively slow to resolve a useful number of tags.

SUMMARY OF THE INVENTION

The present invention addresses the limitations of the above solutions to the collision problem by providing a simple system for collision resolution that does not require the transponder to have read-write capability nor does the solution require additional complexity to the interrogator to perform the anti-collision function.

The invention comprises a method for sending data from a transponder having at least one memory, a transmission criteria, a transmit state and a full cycle flag. The method comprises the steps wherein the transponder: detects the interrogator, such as by receiving a carrier signal from the interrogator; determines that it is time to transmit the data by verifying that it is the transmit-armed state and that the carrier signal has been modified in a predetermined manner; transmits its data in groups of one or more data bits; determines whether its complete data has been read by the interrogator during the transmission of its data; and sets a full cycle flag after sending its complete data transmission. The transponder determines that the interrogator has read the complete data transmission by verifying that the carrier signal has not been modified until the full cycle flag is set. If the transponder determines that the interrogator did not read the complete data transmission, then the transponder stores a number in memory, iteratively changes the number until the number stored in memory satisfies the transmission criteria, and then transmits its data. This process of transmitting and determining whether the complete data has been read by the interrogator during data transmission is repeated until the transponder determines that the interrogator has read the complete data transmission.

The invention also comprises a method for an interrogator to read one or more RFID transponders in a field by: providing a carrier signal; detecting the presence of at least one transponder; modifying the carrier signal in a predetermined manner, such as by sending out a continuous carrier signal; receiving data from all active transponders in the field; determining whether it has received a valid data transmission by checking the validity of each group of data as it is received; and upon determining an invalid data transmission, modifying the carrier signal—such as by suppressing the signal for a predetermined number of clock cycles—to inform all active transponders in the field that there was an incomplete read. The step of modifying the carrier signal is performed prior to the transponder sending its complete data transmission and it is performed substantially simultaneously upon the determination that invalid data transmission has been received. The interrogator iteratively repeats the steps of receiving data and determining whether it has received valid data, until the interrogator determines that it has read the complete data for each transponder in the field. The step of determining that the interrogator has received an invalid data transmission comprises detecting the interrogator's inability to compute a proper synchronization word, a proper CRC, or a proper word length. After determining that the interrogator has received complete data transmission by determining that the CRC is valid, the carrier signal is modified in a predetermined manner, such as by suppressing the signal for a predetermined number of clock cycles. The complete data for each transponder is transmitted from the interrogator to a computer system for processing.

BRIEF DESCRIPTION OF THE DRAWINGS

The invention will be explained in detail with reference to an example of the embodiment with the aid of the drawings as follows.

DETAILED DESCRIPTION OF THE INVENTION

Figure 1:
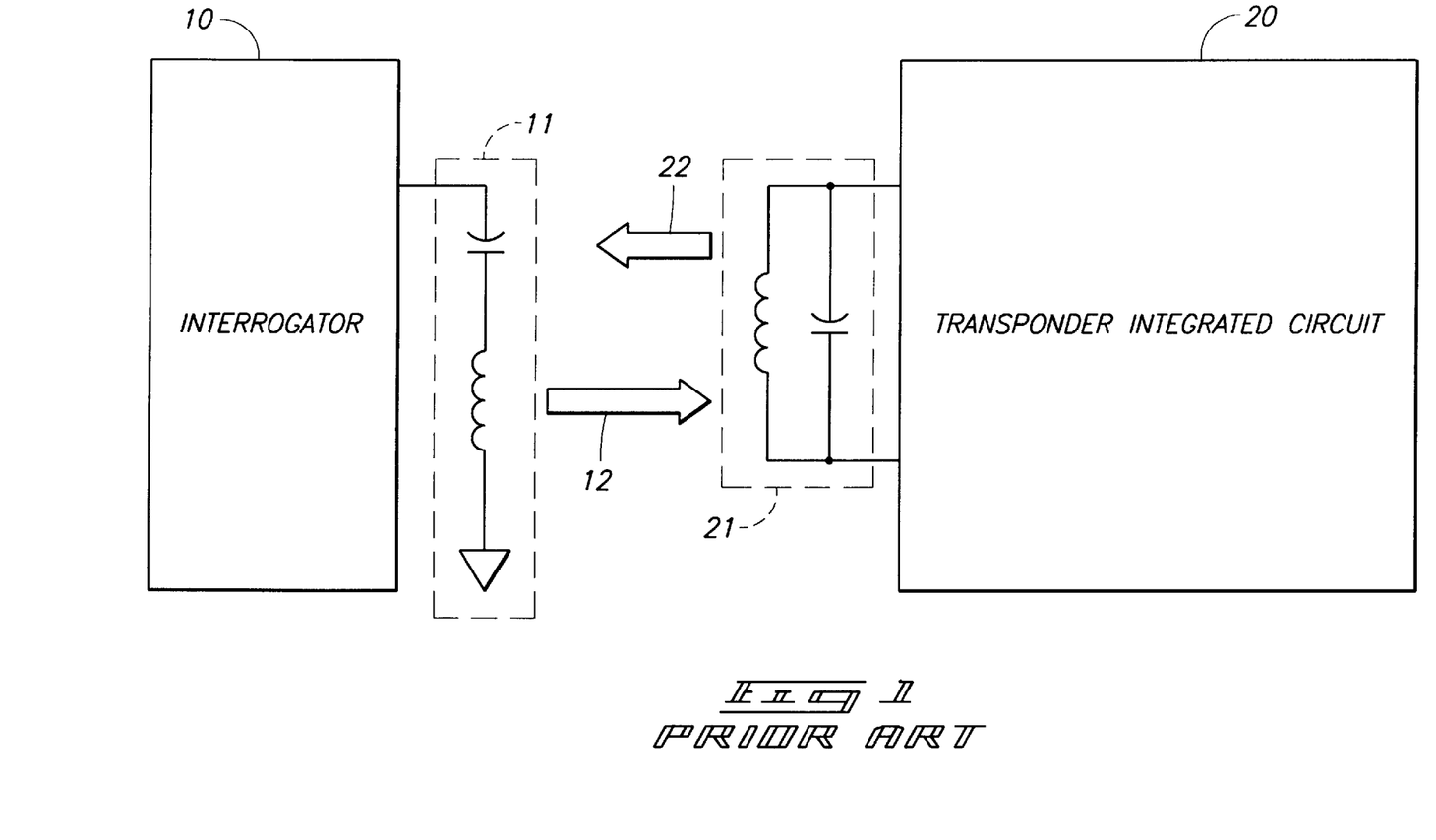
FIG. 1 is a block diagram of a passive RFID system.

Passive, read-only RFID systems are well known in the art and only a brief overview of an RFID system will be given here for reference purposes. Referring to FIG. 1, a passive, read-only RFID system consists of an interrogator 10 and a transponder 20. The interrogator provides a carrier signal 12 necessary for powering and synchronizing the transponder 20, and receives modulated data 22 transmitted from the transponder 20. The interrogator 10 decodes the data from the transponder 20, verifies that the modulated transponder data 22 is valid, and sends this data to a computer system, not shown, for processing.

The interrogator 10 may be connected to a series circuit 11 that is resonant at the desired carrier frequency, or it may be connected to an antenna, depending upon frequency of operation and the desired communications method between the interrogator 10 and the transponder 20.

The transponder 20, in one embodiment, consists of a parallel resonant LC circuit 21. In general, this circuit is resonant at the carrier frequency of the interrogator 10; however, it could be configured such the resonant frequency changes as a function of the transmitted data; or multiple resonant circuits could be utilized to optimize both power reception (resonance at the carrier frequency) and optimize signal strength from the transponder (resonance at the return frequency from the transponder).

Likewise, multiple antennas could be used for the same purpose.

Figure 2:
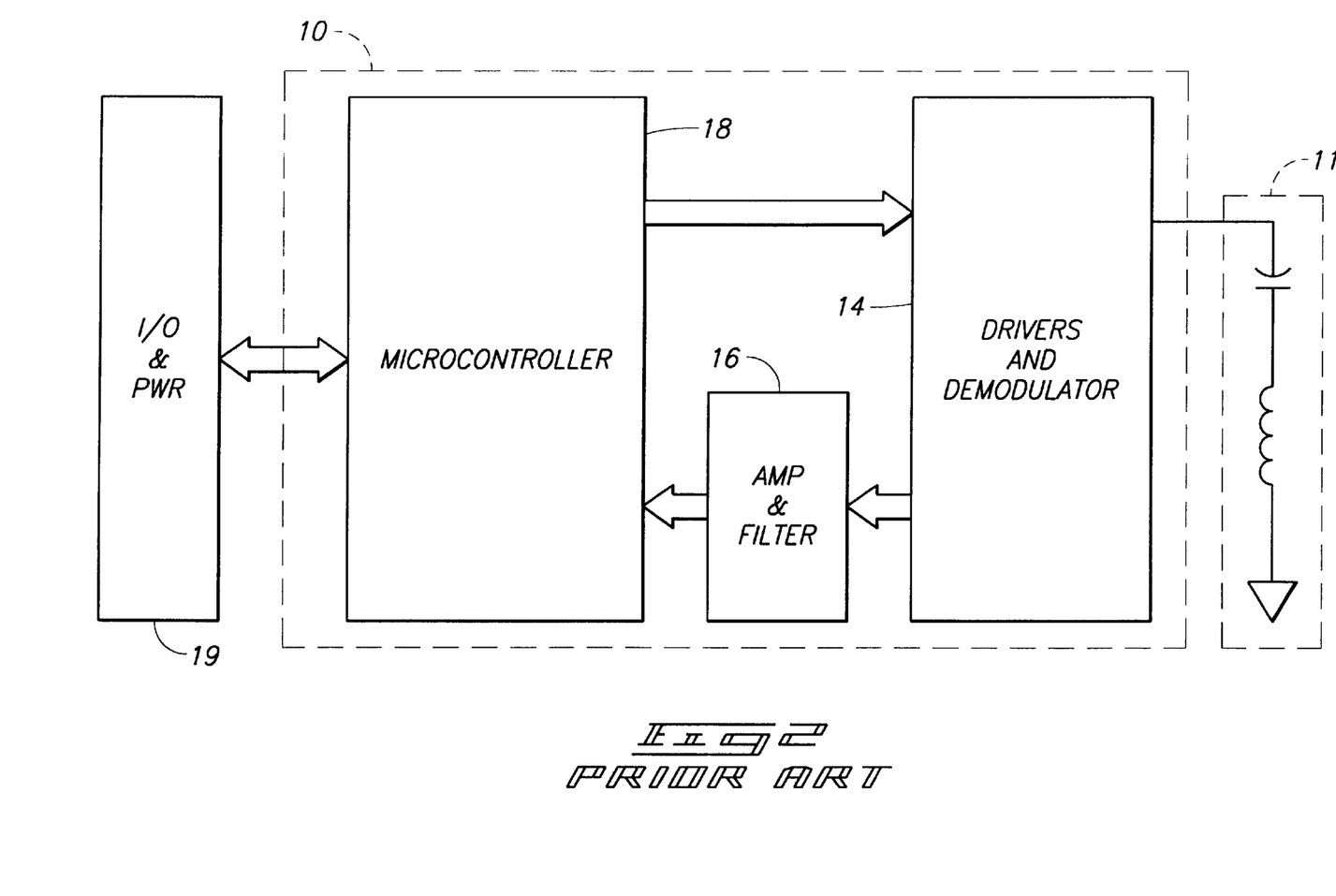
FIG. 2 is a block diagram of an RFID interrogator.

Referring to FIG. 2, a block diagram of a typical RFID interrogator is given. The main components of the interrogator are the microcontroller 18, amplifier and filter 16, demodulator and drivers 14 and I/O circuitry 19.

The microcontroller 18 contains firmware and the necessary I/O lines to provide proper operation of the interrogator. The microcontroller 18 generates a frequency that corresponds to the carrier frequency of the system. For low frequency transponders, this frequency is from the range of 100 kHz to 13.56 MHz. This frequency is filtered to generate a relatively harmonic free sine wave. This sine wave signal is buffered by the driver and demodulator block 14 to provide increased current drive capability. The output of the drivers circuit, not shown, is connected to the series LC circuit 11. The nature of a series resonant circuit driven at the resonant frequency is such that the impedance of the circuit approaches the series resistance of the inductance in the circuit, and the voltage amplitude across the inductor and the capacitor increases to a large magnitude, far in excess of the applied voltage across the series LC circuit.

This large amplitude voltage across the inductor is the carrier referred to in this invention and is necessary to provide sufficient power to the transponder at substantial distances from the interrogator.

The carrier signal 12 is radiated without any underlying information being transmitted, and when a transponder 20 is placed within the field of the interrogator 10, the carrier signal 12 is magnetically coupled to the parallel resonant circuit 21 within the transponder 20. When the transponder 20 is moved to a certain distance from the reader, sufficient power will be applied to the transponder 20 to allow it to begin transmitting its data back to the interrogator 10 by reflecting a load across the magnetically coupled medium.

This reflected load will cause the amplitude of the carrier frequency to vary slightly, and these variations in the carrier frequency are detected by the demodulator. 14 This method of communications is well known and some of the earlier work is described in U.S. Pat. No. 1,744,036 and U.S. Pat. No. 4,333,072, which are hereby incorporated by reference.

The output of the demodulator 14 will consist of the raw encoded data from the transponder 20 as well as a very large component of the carrier frequency and its harmonics. Consequently, it is necessary to provide filtering of this signal. The amp & filter block 16 perform this function. This amp & filter block 16 provides a bandpass filter which allows the signal components to pass but the carrier frequency and its harmonics are sufficiently suppressed. The resultant signal is amplified to provide proper signal levels for the microcontroller 18. In one embodiment, the output of the amp & filter 16 is connected directly to the microcontroller 18.

The microcontroller 18 executes a routine whereby the data from the amp & filter 16 is decoded into the proper logical states, and an error detection routine is executed, whereby, the data received and decoded is determined to be valid or invalid. If the data is valid, the data is sent to a host computer through the I/O block 19. If the data is determined to be invalid, the interrogator 10 ignores the received data and continues processing data from the tag. In other embodiments, and specifically for anti-collision features, the reader determines that invalid data should be construed as a collision of data from multiple transponders 20, and the reader suppresses a number of carrier clocks in addition to ignoring the received data from the transponder(s) 20. The need for clock suppression will be explained in detail when the anti-collision invention is discussed.

Figure 3:
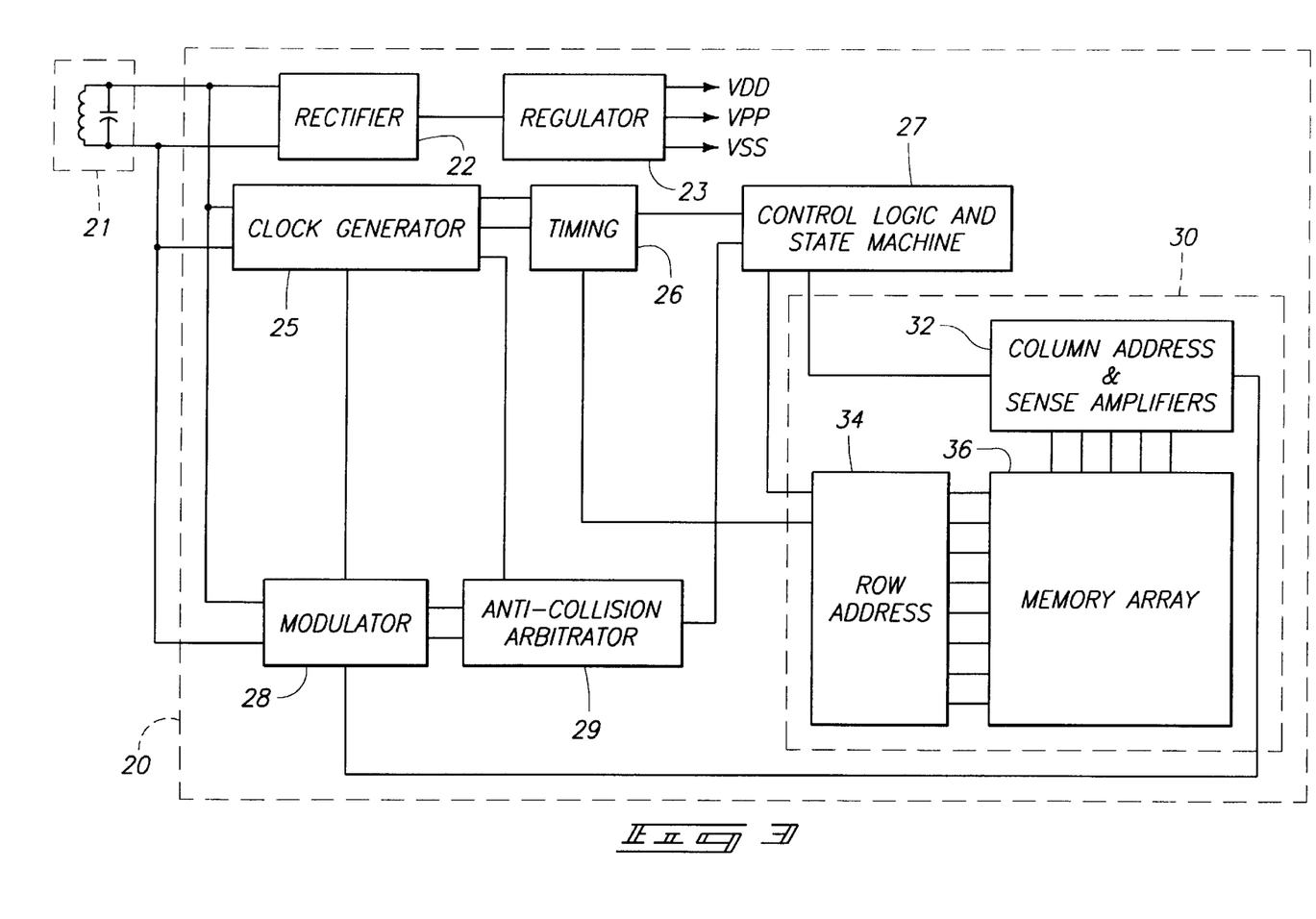
FIG. 3 is a block diagram of a passive RFID transponder.

Referring to FIG. 3, a passive RFID transponder block diagram is shown. The main function blocks are given as: rectifier 22, regulator 23, clock generator 25, timing 26, modulator 28, anti-collision arbitrator 29, control logic and state machine 27, and memory 30. The memory 30 includes: row address 34, column address and sense amplifiers 32, and memory array 36.

The rectifier 22 is typically a full-wave rectifier which converts the AC carrier signal to a DC voltage. The rectifier 22 may also contain clamping diodes or an automatic gain control circuit to prevent an over-voltage condition when the interrogator is placed in close proximity to the transponder coil.

The regulator 23 controls the amplitude of the DC voltage from the rectifier 22 and provides a stable operating voltage for the transponder 20. The regulator 23 may also contains a power-on-reset circuit which prevents the transponder from beginning operation or transmitting data before there is sufficient voltage available for proper operation.

The clock generator 25 performs signal conditioning on the carrier signal to provide a square wave clock signal for timing purposes. Additionally, "glitch" suppression and clock overlaps are eliminated by this circuitry. Another function performed by this circuitry is the detection of missing clocks from the carrier signal. This function will be explained in detail in the section describing the anti-collision function.

The modulator block 28 provides the proper encoding of data and generation of the signals to be transmitted to the interrogator.

The anti-collision arbitrator 29 controls the performance of the transponder 20 when collisions between tags is detected. The anti-collision arbitrator 29 also assigns a random address to the transponders 20 and controls the timing of the data to be transmitted to the interrogator 10. This section will be discussed in detail in subsequent paragraphs.

The row address block 34 is used to address the rows within the memory array 36.

The column address and Sense Amplifier block 32 contains logic addresses each column within the memory array 36 and also contains the sense amplifier to determine the logic state of the specific bit in the array that is being addressed.

The control logic and state machine block 27 executes a specific routine which ensures that proper synchronization data, stored data in the array and Cyclic Redundancy Check (CRC) codes are sent in the proper sequence to the interrogator. This block also inhibits further transmission of data from the transponder 20 once it has been determined that transponder 20 has successfully transmitted its data.

The timing 26 block provides the proper timing for the desired data rate from the transponder. Additionally, the timing 26 block may provide the necessary signals for synchronization with the interrogator.

The memory array 36 stores the unique identification code in a read-only transponder 20, and stores identification and user programmable data in a read/write transponder 20.

Figure 4:
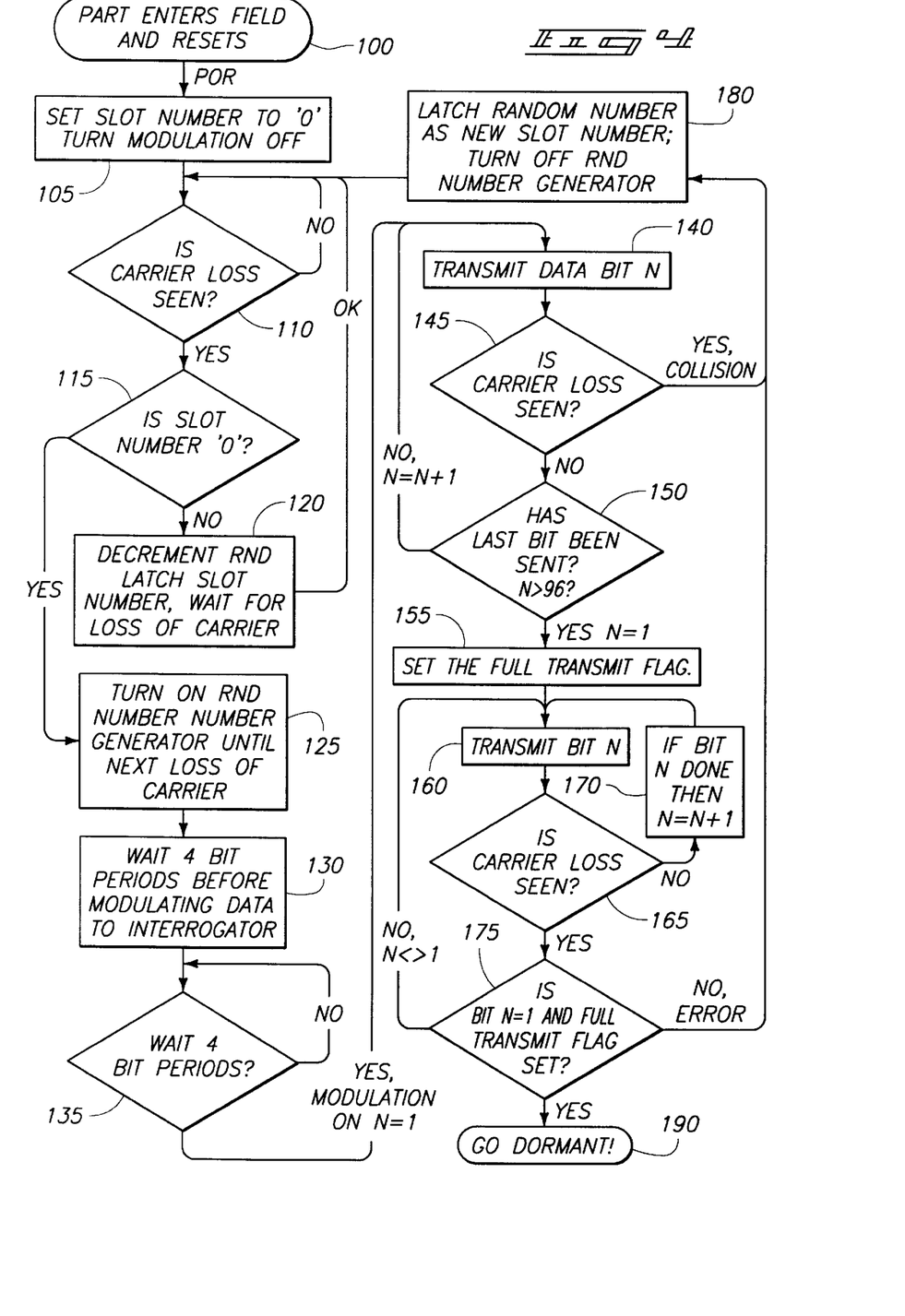
FIG. 4 is a flow chart of the sequence of events that occur within the transponder during collision resolution.
Figure 5:
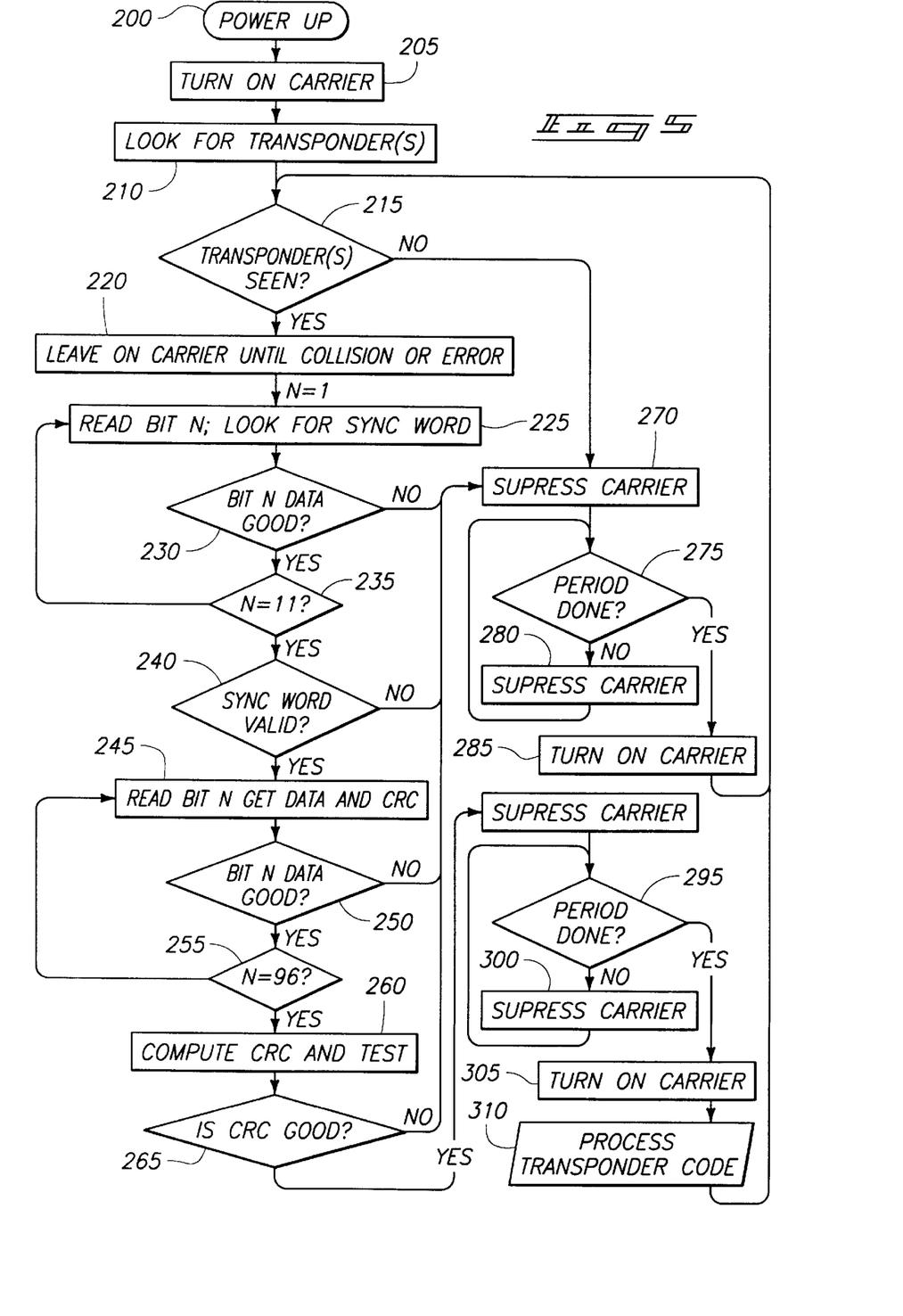
FIG. 5 is a flow chart of the sequence of events that occur within the interrogator during collision resolution.

Referring to FIG. 4 and FIG. 5, flow charts for the operation of the interrogator 10 and the transponder 20, respectively, are shown. During normal operation of the system, the interrogator 10 is sending out a carrier signal 12 for example a 125 kHz sine wave, for a first predetermined number of clock cycles. The interrogator 10 then suppresses the carrier signal 12 for next a second predetermined number of clock cycles. This sequence continues until one or more transponders 20 are detected. The detection of transponders 20 is accomplished by detecting data from the demodulator in the interrogator 10. Once the interrogator 10 detects the presence of transponder(s) 20, the interrogator 10 begins sending out the carrier signal 12 continuously until a collision is detected. Collisions can be detected by the Microcontroller's 18 inability to resolve whether the received data from the AMP & FILTER 16 is a logic '1' or a logic '0'.

If a collision is detected, the interrogator 10 will suppress the carrier signal 12 for a second predetermined period of clocks and then begin transmitting a first predetermined period of clocks. This cycle continues until data from a transponder 20 is detected.

Again, when data from a transponder 20 is detected, the interrogator 10 transmits a continuous carrier signal 12 and processes the data received from the transponder 20.

Other conditions that denote the presence of multiple transponders 20 is the inability to compute a proper synchronization word, inability to compute a proper CRC or improper word length. For example, a person with ordinary skill in the art would recognize that a possible word length is 96 bits, but the invention is not limited by the length of the data word. It is therefore advantageous for the interrogator to examine the received data to determine that it has a proper synchronization word, a proper CRC, and a proper word length. Upon the failure of any of these conditions, may be treated as a collision, as discussed above.

Once the interrogator 10 has determined that it has received the full data word of the proper length, and the CRC is computed correctly, the interrogator will suppress the carrier signal 12 for the second predetermined number of clock periods. It is now necessary to refer to the transponder flow chart, FIG. 4. to understand the difference in behavior of the transponder 20 due to when carrier signal 12 is suppressed for the second predetermined number of clock periods.

When a transponder 20 is sufficiently powered by the interrogator 10, it resets the circuitry within the transponder to a known state. Specifically, it sets the anti-collision arbitrator 29 to the 'transmit armed' state. The transponder does not transmit data, it merely waits until it determines that the carrier signal 12 has been suppressed for a predetermined number of clock periods. When the transponder 20 determines that the interrogator 10 is again sending a carrier signal 12 after the suppression for a predetermined number of clock periods, and the transponder 20 determines that it is in the 'transmit armed' state, it begins to execute a sequence of commands that will cause data from the memory array 26 to be modulated and transmitted to the interrogator 10.

If, due to the conditions previously discussed when describing the interrogator flow chart a collision is detected and the interrogator suppress the carrier signal 12 for a second period, the transponder 20 will determine that a suppression of clocks has occurred and, if the full-cycle flag has not been set, the transponder 20 will cease transmitting its data. Concurrently, the transponder 20 will load a new number into its address register. Preferably, this will be a random number.

As previously described, the interrogator 10 will continuously cycle through generation of clocks for a first predetermined amount of time and suppression of clocks for a second predetermined amount of time.

Each time the interrogator 10 suppresses the carrier signal 12 for a second predetermined number of clock cycles, the address is decremented by one count. Alternatively, the count may be increased or decreased by a different number of cycles, each address in each transponder 20 is altered. When a transponder 20 has its address reach a preset critical value, the anti-collision to 'transmit armed' state and the transponder 20 begins to transmit its data. Preferably, the critical value is when the address is zero.

If no collisions are detected, the transponder 20 will transmit its full cycle and the interrogator 10 will send out a continuous carrier signal 12 until it verifies that all data has been properly received.

Likewise, for the other transponders 20 in the field, the detection of missing clocks causes their addresses to be altered, and preferably decremented. This cycle continues until another transponder 20 has a address of the critical value and the anti-collision arbitrator changes 'transmit armed' state, at which time the transponder 20 begins to transmit its data.

If more than one transponder 20 has their address as the critical value, the reader detects the collision and stops the clocks for a second predetermined number of cycles. At that time, only the transponders 20 with an address of the critical will recompute their addresses, preferably with a random number.

The operation of a specific embodiment is described in FIG. 4 which is a flow chart outlining the process steps for the transponder 20. The transponder 20 enters the field generated by the interrogator 10 and resets 100 by setting itself to the transmit-armed state and by removing the full-cycle flag. The number in memory 30 is set to zero and modulation is turned off 105. The transponder 20 detects the presence of an interrogator by checking 110 whether the transponder 20 sees modification of the carrier signal in a predetermined manner, which for this embodiment is carrier signal 12 loss. The transponder 20 iteratively keeps checking until the transponder 20 sees a loss and then determines whether the number in memory 30 satisfies the transmission criteria. In the embodiment described in FIG. 4, the transponder 20 determines whether the number in memory 30 is equal to zero 115 to satisfy the transmission criteria. If the number in memory 30 does not satisfy the transmission criteria which for this embodiment the number would not equal zero, then the number is modified. For this embodiment, modification is achieved by decrementing the number 120 and then returning to the iterative process of checking to determine whether there is any carrier signal loss 110. If the number in memory 30 equals zero, then the random number generator is turned on until the next loss of carrier 125. The transponder 20 modulates the data to the interrogator 10 after waiting four bit periods 130. The transponder 20 iteratively determines whether it has waited four bit periods 135 and if so, modulation occurs on the first data bit.

The transponder 20 transmits the data one bit at a time 140, staring with the first data bit. The transponder 20 then iteratively determines whether the carrier signal 12 has been modified in a predetermined manner, which in this embodiment is the determination 145 of whether the transponder 20 sees any carrier signal 12 loss. If the transponder 20 determines that there is a loss in the carrier signal 12, then the transponder 20 detects a collision and the random number generator generates a new number, the random number generator is turned off 180, and the transponder 20 iteratively determines whether there is any carrier signal loss 110.

If the transponder 20 determines that there is no carrier loss after transmitting the data bit 145, then the transponder 20 determines whether the last data bit has been sent (complete data transmission), which in this embodiment would require the determination of whether the 96th data bit had been sent 150. If the last data bit has not been sent, then the next data bit is transmitted 140 to the interrogator 10. If the transponder determines that the last data bit has been sent, then the transponder 20 sets the full-cycle flag 155.

After setting the full cycle flag, the transponder 20 transmits the first data bit 160 to the interrogator 10. The transponder 20 then iteratively determines whether the carrier signal 12 has been modified in a predetermined manner, which in this embodiment is the determination 165 of whether the transponder 20 sees any carrier signal 12 loss. If the transponder 20 determines that there is no carrier loss, then the transponder 20 iteratively transmits 160 the next bit of data.

If the transponder 20 determines that there is a loss in the carrier signal 12, then the transponder 20 determines 175 whether the first bit was just transmitted and whether the full-cycle flag is set. If the data is not the first data bit then the transponder iteratively transmits 160 the next data bit. If the full-cycle flag has not been set and the data is the first bit, then the transponder 20 detects an error and the random number generator generates a new number, the random number generator is turned off 180, and the transponder 20 iteratively determines whether there is any carrier signal loss 110.

If the transponder 20 determines 175 that the first data bit has been sent and the full-cycle flag is set, then the transponder 20 determines that the interrogator 10 has read the complete data set and the transponder 20 goes dormant 190.

An embodiment is described in FIG. 5, which shows the process steps for the interrogator 10. The interrogator 10 is powered up 200 and immediately begins transmitting 205 the carrier signal 12. The interrogator 10 looks 215 for transponders 20 during the first predetermined period 210 and if the interrogator 10 does not detect 215 a transponder 20, the interrogator 10 suppresses 270 the carrier signal 12 for a second predetermined period to signal a new tag or transponder 20 to transmit or to sync colliding tags. The interrogator 10 next determines 275 whether the period is complete and continues to suppress 280 the carrier signal 12 until the interrogator determines 275 that the period done, in which case, the interrogator 10 turns on 285 the carrier signal 12. The interrogator 10 then repeats the process and looks 210 for transponders 20 during the first predetermined period. If the interrogator 10 detects 215 the presence of a transponder 20, the interrogator 10 leaves the carrier signal 12 on until it receives 220 invalid data due to a collision or error.

The interrogator 10 reads 225 the first bit of data, looking for a sync word. The interrogator 10 iteratively determines 230 whether each bit of data is good and if the data bit is bad, the interrogator 10 detects a collision and suppresses 270 the carrier signal 12 for a second predetermined period to signal a new tag or transponder 20 to transmit or to sync colliding tags. The interrogator 10 next determines 275 whether the period is complete and continues to suppress 280 the carrier signal 12 until the interrogator determines 275 that the period done, in which case, the interrogator 10 turns on 285 the carrier signal 12. The interrogator 10 then repeats the process and looks 210 for transponders 20 during the first predetermined period. If the interrogator 10 determines 230 that each data bit is good, at the eleventh bit, the interrogator 10 determines whether the sync word valid and if the sync word is invalid, the interrogator 10 detects an error and suppresses 270 the carrier signal 12 for a second predetermined period to signal a new tag or transponder 20 to transmit or to sync colliding tags. The interrogator 10 next determines 275 whether the period is complete and continues to suppress 280 the carrier signal 12 until the interrogator determines 275 that the period done, in which case, the interrogator 10 turns on 285 the carrier signal 12. The interrogator 10 then repeats the process and looks 210 for transponders 20 during the first predetermined period.

If the interrogator 10 determines 240 that the sync word is valid, the interrogator 10 continues to read 245 each data bit to obtain data and the CRC. The interrogator 10 determines 250 whether each data bit is valid and if the data is bad, the interrogator 10 detects a collision and the interrogator 10 suppresses 270 the carrier signal 12 for a second predetermined period to signal a new tag or transponder 20 to transmit or to sync colliding tags. The interrogator 10 next determines 275 whether the period is complete and continues to suppress 280 the carrier signal 12 until the interrogator determines 275 that the period done, in which case, the interrogator 10 turns on 285 the carrier signal 12. The interrogator 10 then repeats the process and looks 210 for transponders 20 during the first predetermined period.

If the interrogator 10 determines 250 that the data bit is good, the interrogator 10 iteratively continues to read the next data bit until the interrogator 10 determines 255 that it has read the ninety-sixth data bit, wherein the interrogator 10 computes 260 the CRC and tests. If the interrogator 10 determines 265 that the CRC is not good, then the interrogator 10 detects a collision and the interrogator 10 suppresses 270 the carrier signal 12 for a second predetermined period to signal a new tag or transponder 20 to transmit or to sync colliding tags. The interrogator 10 next determines 275 whether the period is complete and continues to suppress 280 the carrier signal 12 until the interrogator determines 275 that the period done, in which case, the interrogator 10 turns on 285 the carrier signal 12. The interrogator 10 then repeats the process and looks 210 for transponders 20 during the first predetermined period.

If the interrogator determines 265 that the CRC is good, then the interrogator 10 suppresses 290 the carrier signal 12 for a second predetermined period when the interrogator 10 reads the first data bit in order to signal to the transponder 20 that it was read. The interrogator 10 next determines 295 whether the period is complete and continues to suppress 300 the carrier signal 12 until the interrogator determines 295 that the period done, in which case, the interrogator 10 turns on 305 the carrier signal 12 and process 310 the transponder code. The interrogator 10 then repeats the process and looks 210 for transponders 20 during the first predetermined period.

Figure 6:
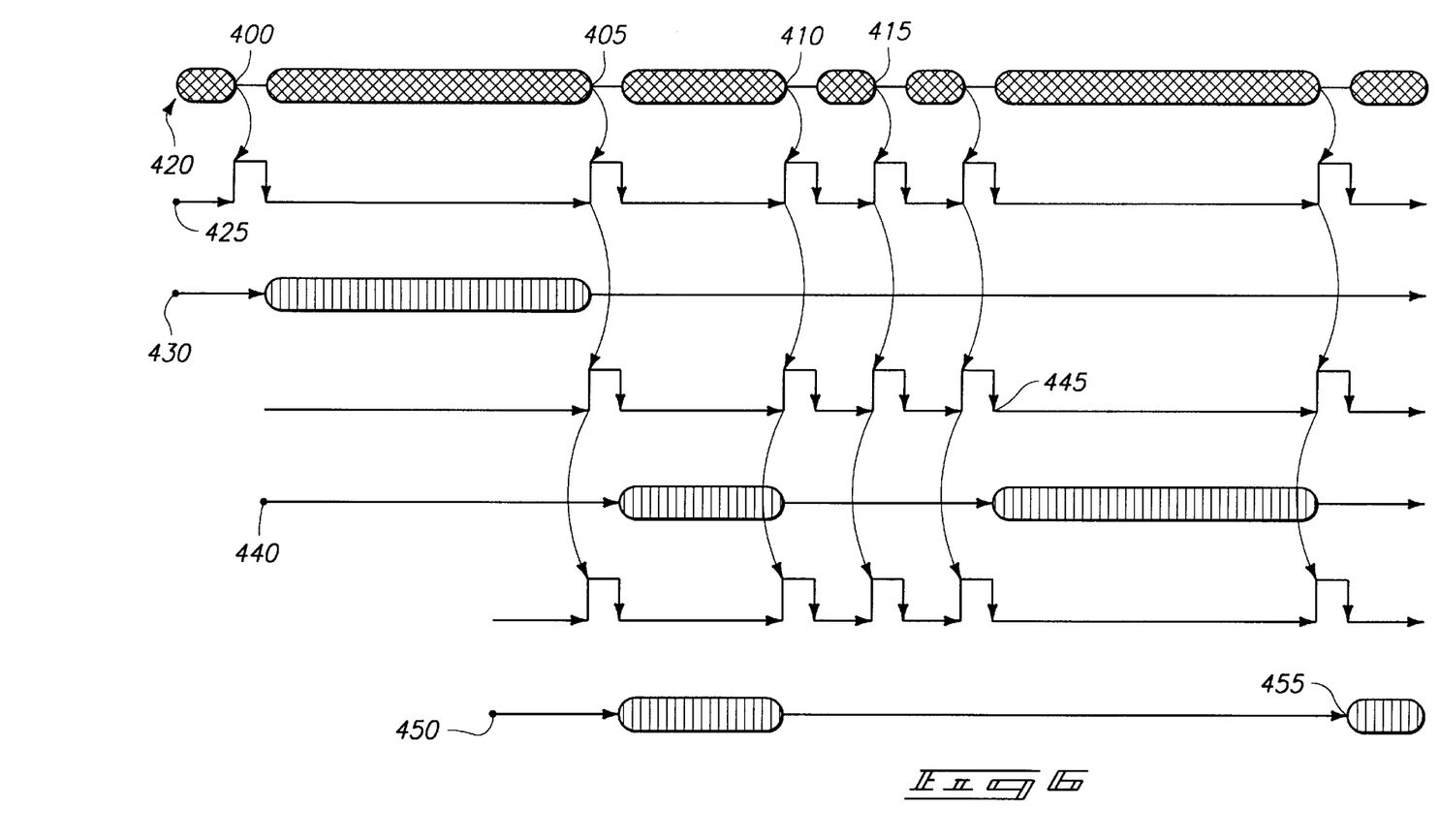
FIG. 6 is a timing diagram showing clock waveforms from the interrogator.

An example of the anti-collision timing is shown in FIG. 6. The carrier signal 12 sent by the interrogator is represented pictorially by 420, wherein the signal interrupts are shown as square wave pulses in 425. The interrogator 10 or reader sends 400 interrupts and bursts to look for tags or transponders 20. The first tag is within the reader's field upon the end of the suppression of the carrier signal 12 at position 400, the transponder 20 and the reader detects 400 the presence of the first tag and transmits the carrier signal continuously. The first tag transmits its data 430 to the reader.

The reader reads the first tag, waits till the first bit is repeated for the first tag and sends an interrupt at time position 405 which starts the second 440 and third 450 tags transmitting. The reader detects the collision and sends an interrupt at time position 410. The reader continues to send interrupts and bursts at time position 415 looking for tags. When the reader detects the presence of the second tag, it sends a continuous carrier signal while reading the tag. Because the second tag generated a random number of three, the tag transmits its data on the third interrupt 445. Similarly, the third tag generated a random number of four and it sends its data after waiting one more time slot on the fourth interrupt 455.

The present invention has been described above with reference to a preferred embodiment. However, those skilled in the art will recognize that changes and modifications may be made in this embodiment without departing from the scope of the present invention. Those skilled in the art will recognize that the various specific tasks and devices described herein in connection with this embodiment may be altered significantly without departing from the scope of the present invention. These and other changes and modifications which are obvious to those skilled in the art are intended to be within the scope of the present invention.

What is claimed is:

1. A method for reading RFID transponders in a field, the method comprising:
   transmitting a carrier signal;
   detecting the presence of at least one of the transponders in the field;
   receiving data from all of the transponders in the field;
   determining whether the received data is valid; and
   in response to determining that the received data is invalid, informing all transponders in the field that there was an incomplete read, the informing including suppressing the carrier.

2. The method of claim 1, wherein the receiving and determining are iteratively repeated until the complete data is read for each transponder in the field.

3. The method of claim 2, further comprising transmitting the complete data for each transponder to a computer system for processing.

4. The method of claim 1, wherein the detecting comprises receiving a signal from a transponder, demodulating the received signal, and modifying the transmitted carrier signal in a predetermined manner.

5. The method of claim 4, wherein modifying the transmitted carrier signal in a predetermined manner comprises sending out the carrier signal continuously.

6. The method of claim 1, wherein determining whether the received data is invalid comprises detecting inability to compute a proper synchronization word, a proper CRC, or a proper word length.

7. The method of claim 1, wherein suppressing the carrier comprises suppressing the carrier for a predetermined number of clock cycles.

8. The method of claim 1, wherein informing active transponders in the field that there was an incomplete read is performed prior to the transponder sending its complete data transmission.

9. The method of claim 8 wherein informing active transponders in the field that there was an incomplete read is performed substantially simultaneously upon the determination that invalid data transmission has been received.

10. The method of claim 1, wherein the receiving comprises receiving the data in groups of bits, and wherein the validity of each group of data is checked as it is received.

11. The method of claim 2, wherein determining complete data transmission comprises determining that a CRC for the received data is valid and modifying the carrier signal in a predetermined manner.

12. The method of claim 4, wherein modifying the carrier signal in a predetermined manner comprises suppressing the carrier signal for a predetermined number of clock cycles.

13. A method for reading one or more RFID transponders in a field, the transponders including transponders that are active and capable of communicating, the method comprising:
   providing a carrier signal;
   detecting the presence of at least one transponder, the detecting including using a demodulator and modifying the carrier signal by suppressing the carrier signal for a predetermined number of clock cycles;
   receiving data from all active transponders in the field, the receiving including receiving the data in groups of one or more bits and checking the validity of each group of data as the group is received;
   determining whether a valid data transmission has been received by detecting inability to compute a proper synchronization word, a proper CRC, or a proper word length;
   in response to determining an invalid data transmission, modifying the carrier signal to inform all active transponders in the field that there was an incomplete read; and
   transmitting the complete data for each transponder to a computer system for processing.

14. The method of claim 13, wherein modifying the carrier signal is performed prior to the transponder sending its complete data transmission.

15. The method of claim 13 wherein modifying the carrier signal is performed substantially simultaneously upon the determination that invalid data transmission has been received.

16. The method of claim 13 wherein the receiving and the determining whether a valid transmission has been received are iteratively repeated until the complete data has been read for each transponder in the field.

17. The method of claim 16, wherein the determining whether a valid transmission has been received comprises determining that a CRC is valid and modifying the carrier signal in a predetermined manner.

18. A method for reading one or more RFID transponders in a field, the method comprising:

providing a carrier signal;

detecting the presence of at least one transponder, the detecting including modifying the carrier signal in a predetermined manner;

receiving data from all active transponders in the field, the receiving including receiving the data in groups of one or more bits and checking the validity of each group of data as it is received;

determining whether a valid data transmission has been received; the receiving and the determining being iteratively repeated until complete data for each transponder in the field has been read, the determining that complete data has been read for one of the transponders including determining that the CRC is valid and suppressing the carrier;

upon determining an invalid data transmission, modifying the carrier signal to inform all active transponders in the field that there was an incomplete read; and transmitting the complete data for each transponder to a computer system for processing.

19. The method of claim 18, wherein modifying the carrier signal in a predetermined manner comprises sending out the carrier signal continuously.

20. The method of claim 18, wherein modifying the carrier signal in a predetermined manner comprises suppressing the carrier signal for a predetermined number of clock cycles.

21. The method of claim 20, wherein modifying the carrier signal is performed prior to the transponder sending its complete data transmission.

22. The method of claim 20 wherein modifying the carrier signal is performed substantially simultaneously upon the determination that an invalid data transmission has been received.

23. The method of claim 18, wherein determining whether the interrogator has received an invalid data transmission comprises detecting inability to compute a proper synchronization word, a proper CRC, or a proper word length.

24. A method for reading RFID transponders in a field, the method comprising:

transmitting a carrier signal;

receiving data from transponders in the field;

determining whether the received data is valid or invalid; and in response to determining that the received data is invalid, informing all transponders in the field that there was an incomplete read, the informing including suppressing the carrier.

25. The method of claim 24, wherein the receiving and determining are iteratively repeated until the complete data is read for each transponder in the field.

26. The method of claim 25, further comprising transmitting the complete data for each transponder to a computer system for processing.

27. The method of claim 24, wherein determining whether the received data is invalid comprises detecting inability to compute a proper synchronization word, a proper CRC, or a proper word length.

28. The method of claim 24, wherein suppressing the carrier comprises suppressing the carrier for a predetermined number of clock cycles.

29. The method of claim 24, wherein informing active transponders in the field that there was an incomplete read is performed prior to the transponder sending its complete data transmission.

30. The method of claim 29 wherein informing active transponders in the field that there was an incomplete read is performed substantially simultaneously upon the determination that invalid data transmission has been received.

31. The method of claim 24, wherein the receiving comprises receiving the data in groups of bits, and wherein the validity of each group of data is checked as the group is received.

32. The method of claim 25, wherein determining complete data transmission comprises determining that a CRC for the received data is valid and modifying the carrier signal in a predetermined manner.

33. The method of claim 27, wherein modifying the carrier signal in a predetermined manner comprises suppressing the carrier signal for a predetermined number of clock cycles.

34. An interrogator for reading RFID transponders in a field, the interrogator comprising:

a modulator configured to transmit a carrier signal;

a receiver configured to receive data from transponders in the field;

circuitry coupled to the modulator and receiver configured to determine whether the received data is valid or invalid and, in response to determining that the received data is invalid, to inform all transponders in the field that there was an incomplete read, by suppressing the carrier for an amount of time.

* * * * *

UNITED STATES PATENT AND TRADEMARK OFFICE
CERTIFICATE OF CORRECTION

PATENT NO.    : 6,091,319
DATED         : Jul. 18, 2000
INVENTOR(S)   : Donald L Black and Dale Yones

It is certified that error appears in the above-identified patent and that said Letters Patent are hereby corrected as shown below:

Title: [54] "Signals" should be --Signal--.

Inventors: [75] "Yornes" should be --Yones--.

Signed and Sealed this

Seventeenth Day of April, 2001

Attest:

NICHOLAS P. GODICI

Attesting Officer    Acting Director of the United States Patent and Trademark Office